United States Patent
David

(10) Patent No.: US 12,491,775 B2
(45) Date of Patent: Dec. 9, 2025

(54) SYSTEM AND METHOD FOR RECIRCULATING POWER

(71) Applicant: Dana Heavy Vehicle Systems Group, LLC, Maumee, OH (US)

(72) Inventor: Jeffrey M. David, Cedar Park, TX (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 882 days.

(21) Appl. No.: 17/445,567

(22) Filed: Aug. 20, 2021

(65) Prior Publication Data
US 2023/0054823 A1 Feb. 23, 2023

(51) Int. Cl.
*B60L 15/00* (2006.01)
*B60L 15/20* (2006.01)

(52) U.S. Cl.
CPC ........... *B60L 15/2045* (2013.01); *B60L 15/20* (2013.01); *B60L 15/2009* (2013.01)

(58) Field of Classification Search
CPC .. B60L 15/2045; B60L 15/20; B60L 15/2009; B60L 58/13; B60L 2220/42; B60L 2260/26; B60K 17/36; B60K 2007/0038; B60K 7/0007; B60K 2001/001; B60K 2007/0092; B60K 1/00; B60K 17/354; B60K 17/356
See application file for complete search history.

(56) References Cited

U.S. PATENT DOCUMENTS

| | | | |
|---|---|---|---|
| 5,291,960 A | 3/1994 | Brandenburg et al. | |
| 5,508,574 A | 4/1996 | Mock | |
| 5,941,328 A | 8/1999 | Lyons et al. | |
| 6,116,368 A | 9/2000 | Lyons et al. | |
| 6,155,364 A * | 12/2000 | Nagano | B60K 6/26 903/910 |
| 6,332,504 B1 | 12/2001 | Adds | |
| 6,886,647 B1 * | 5/2005 | Gotta | B60L 15/2009 180/65.285 |
| 7,256,510 B2 * | 8/2007 | Holmes | B60W 10/26 475/5 |
| 7,448,460 B2 | 11/2008 | Morrow et al. | |
| 7,491,144 B2 | 2/2009 | Conlon | |

(Continued)

FOREIGN PATENT DOCUMENTS

| | | |
|---|---|---|
| CN | 107215203 A | 9/2017 |
| EP | 0611675 A1 | 8/1994 |

(Continued)

OTHER PUBLICATIONS

David, J. et al., "Electric Drivetrain and Method for Operation of Said Drivetrain," U.S. Appl. No. 17/334,528, filed May 28, 2021, 24 pages.

*Primary Examiner* — Ian Jen
(74) *Attorney, Agent, or Firm* — McCoy Russell LLP

(57) ABSTRACT

Methods and systems for operating a driveline that includes two electric machines are described. In one example, one electric machine is operated in a generator mode and the other electric machine is operated in a motor mode so that electric power that is generated by the electric machine that is operated in the generator mode is consumed by the electric machine that is operated in the motor mode.

20 Claims, 5 Drawing Sheets

(56) References Cited

U.S. PATENT DOCUMENTS

| | | | | |
|---|---|---|---|---|
| 7,497,285 B1* | 3/2009 | Radev | ................ | B60K 6/52 |
| | | | | 180/65.23 |
| 8,453,770 B2* | 6/2013 | Tang | ................ | B60L 15/2036 |
| | | | | 180/65.6 |
| 8,634,939 B2* | 1/2014 | Martin | ............ | B60W 30/18136 |
| | | | | 701/72 |
| 8,761,985 B2* | 6/2014 | Tang | ................ | B60L 15/20 |
| | | | | 701/22 |
| 8,930,055 B2* | 1/2015 | Yuan | ................ | F16H 3/44 |
| | | | | 475/904 |
| 9,370,993 B2* | 6/2016 | Chen | ................ | B60W 20/30 |
| 9,481,263 B2* | 11/2016 | Ebert | ................ | B60L 3/04 |
| 10,745,001 B2* | 8/2020 | Glück | ................ | B60K 6/44 |
| 10,933,752 B2* | 3/2021 | Miller | ................ | B60L 7/18 |
| 11,001,164 B1* | 5/2021 | Aburto | ................ | B60L 58/12 |
| 2004/0058769 A1* | 3/2004 | Larkin | ................ | B60W 20/00 |
| | | | | 903/910 |
| 2005/0223706 A1* | 10/2005 | Mitchell | ................ | F02B 37/04 |
| | | | | 60/606 |
| 2008/0230284 A1 | 9/2008 | Schoon | | |
| 2008/0251909 A1* | 10/2008 | Tokuyama | ............ | H01L 25/072 |
| | | | | 257/E23.18 |
| 2009/0255744 A1 | 10/2009 | Kitano | | |
| 2010/0133023 A1* | 6/2010 | Tang | ................ | B60K 7/0007 |
| | | | | 180/65.1 |
| 2010/0187024 A1* | 7/2010 | Tang | ................ | B60L 50/52 |
| | | | | 701/22 |
| 2010/0187905 A1* | 7/2010 | Tang | ................ | B60L 50/52 |
| | | | | 307/10.1 |
| 2010/0222953 A1* | 9/2010 | Tang | ................ | B60L 15/20 |
| | | | | 701/22 |
| 2011/0299265 A1* | 12/2011 | Nakatsu | ................ | H01L 25/072 |
| | | | | 361/820 |
| 2012/0255798 A1* | 10/2012 | Palmer | ................ | B60K 17/04 |
| | | | | 180/65.6 |
| 2012/0310461 A1* | 12/2012 | Maruyama | ............ | B60W 10/08 |
| | | | | 74/665 F |
| 2013/0021749 A1* | 1/2013 | Nakajima | .......... | H05K 7/20927 |
| | | | | 361/689 |
| 2013/0203551 A1 | 8/2013 | Mellet et al. | | |
| 2013/0241445 A1* | 9/2013 | Tang | ................ | B60L 15/2036 |
| | | | | 318/52 |
| 2014/0156127 A1* | 6/2014 | Ebert | ................ | B60L 3/0084 |
| | | | | 701/22 |
| 2014/0358340 A1* | 12/2014 | Radev | ................ | B60W 10/26 |
| | | | | 180/65.265 |
| 2015/0003019 A1* | 1/2015 | Ide | ................ | H05K 7/02 |
| | | | | 361/728 |
| 2015/0112619 A1* | 4/2015 | Takahashi | ............ | H01M 10/48 |
| | | | | 702/63 |
| 2015/0189784 A1* | 7/2015 | Hirano | ................ | H05K 7/1432 |
| | | | | 361/728 |
| 2015/0224864 A1* | 8/2015 | Schwartz | ................ | B60K 6/28 |
| | | | | 180/65.245 |
| 2015/0298574 A1 | 10/2015 | Bramson | | |
| 2015/0318811 A1* | 11/2015 | Ota | ................ | B60L 58/27 |
| | | | | 318/139 |
| 2016/0052382 A1* | 2/2016 | Clark | ................ | B60W 10/02 |
| | | | | 180/65.265 |
| 2016/0238110 A1* | 8/2016 | Morrow | ................ | F16H 3/728 |
| 2016/0318420 A1* | 11/2016 | Hirai | ................ | B60L 15/2054 |
| 2016/0332614 A1* | 11/2016 | Ogura | ................ | B60K 6/383 |
| 2017/0028837 A1* | 2/2017 | Welschoff | ............ | B60L 58/12 |
| 2017/0101086 A1* | 4/2017 | Oshiumi | ................ | B60K 6/387 |
| 2017/0144650 A1* | 5/2017 | Nagamiya | ............ | B60W 20/13 |
| 2017/0217423 A1* | 8/2017 | Aoki | ................ | B60W 20/40 |
| 2019/0193719 A1* | 6/2019 | Glück | ................ | B60W 10/113 |
| 2020/0023734 A1 | 1/2020 | Crotti et al. | | |
| 2020/0132059 A1* | 4/2020 | Ikemoto | ................ | B60W 10/06 |
| 2020/0262311 A1* | 8/2020 | Miller | ................ | B60W 10/08 |
| 2020/0324647 A1* | 10/2020 | Cook | ................ | B60K 17/02 |
| 2020/0398658 A1* | 12/2020 | Li | ................ | B60K 17/344 |
| 2021/0016647 A1* | 1/2021 | Houser | ................ | F16H 63/304 |
| 2021/0095744 A1* | 4/2021 | David | ................ | F16H 15/50 |
| 2021/0155112 A1* | 5/2021 | Herring | ................ | B60K 35/21 |
| 2021/0178905 A1* | 6/2021 | Miller | ................ | B60L 58/12 |
| 2021/0221214 A1* | 7/2021 | Haka | ................ | B60K 6/365 |

FOREIGN PATENT DOCUMENTS

| | | |
|---|---|---|
| GB | 2224171 A | 4/1990 |
| WO | 2019195229 A1 | 10/2019 |

* cited by examiner

SYSTEM AND METHOD FOR RECIRCULATING POWER

TECHNICAL FIELD

The present disclosure relates to a system and method for providing regenerative braking for a vehicle during conditions when it may not be desirable to store charge in an energy storage device.

BACKGROUND AND SUMMARY

A vehicle may include an electric machine that may provide propulsive force to propel the vehicle. The electric machine may also operate as a generator to convert a vehicle's kinetic energy into electrical energy and provide vehicle braking (regenerative braking). The electric machine may operate as a generator when driver demand torque is low, or if the vehicle is a hybrid vehicle and it is desirable to charge the vehicle's electric energy storage device. However, if the vehicle's electric energy storage device state of charge is high, or if some other condition is present that limits charging of the electric energy storage device, the vehicle may not operate the electric machine as a generator to reduce a possibility of supplying more energy to the electric energy storage device than may be desired. If the electric machine is not operated as a generator, the vehicle may revert to applying friction foundation brakes to slow the vehicle. Nevertheless, it may not be desirable to operate the vehicle with its friction foundation brakes while the vehicle is traveling on a road with an extended significant negative grade because the friction foundation brakes may be less effective if the friction foundation brakes are vigorously applied for an extended duration. Therefore, it may be desirable to provide a way of operating a vehicle that may reduce friction brake usage and effort.

The inventor herein has recognized the abovementioned issues and have developed a method for operating a vehicle, comprising: operating a first electric machine in a motor mode; operating a second electric machine in a generator mode, while operating the first electric machine in the motor mode, and while a net power amount exchanged between an electric energy storage device and the first electric machine and the second electric machine is substantially zero.

By operating one electric machine in a generator mode and by operating a second electric machine in a motor mode, it may be possible to provide the technical result of providing vehicle braking without supplying charge to an electric energy storage device. In particular, electric power that is generated by one electric machine may be consumed by a second electric machine. Further, the electric machine that is operated as the generator may be operated less efficiently than the electric machine that is operated as the motor so that the electric machine that operates as the generator provides braking to the vehicle.

The system and method may provide several advantages. Specifically, the system and methods described herein may provide vehicle braking at times when it may not be desirable for an electric energy storage device to accept additional power. In addition, the present system and methods may adjust an amount of braking that is provided to a vehicle via adjusting gear ratios that are coupled to the electric machines. In addition, the system and methods may reduce wear of friction foundation brakes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
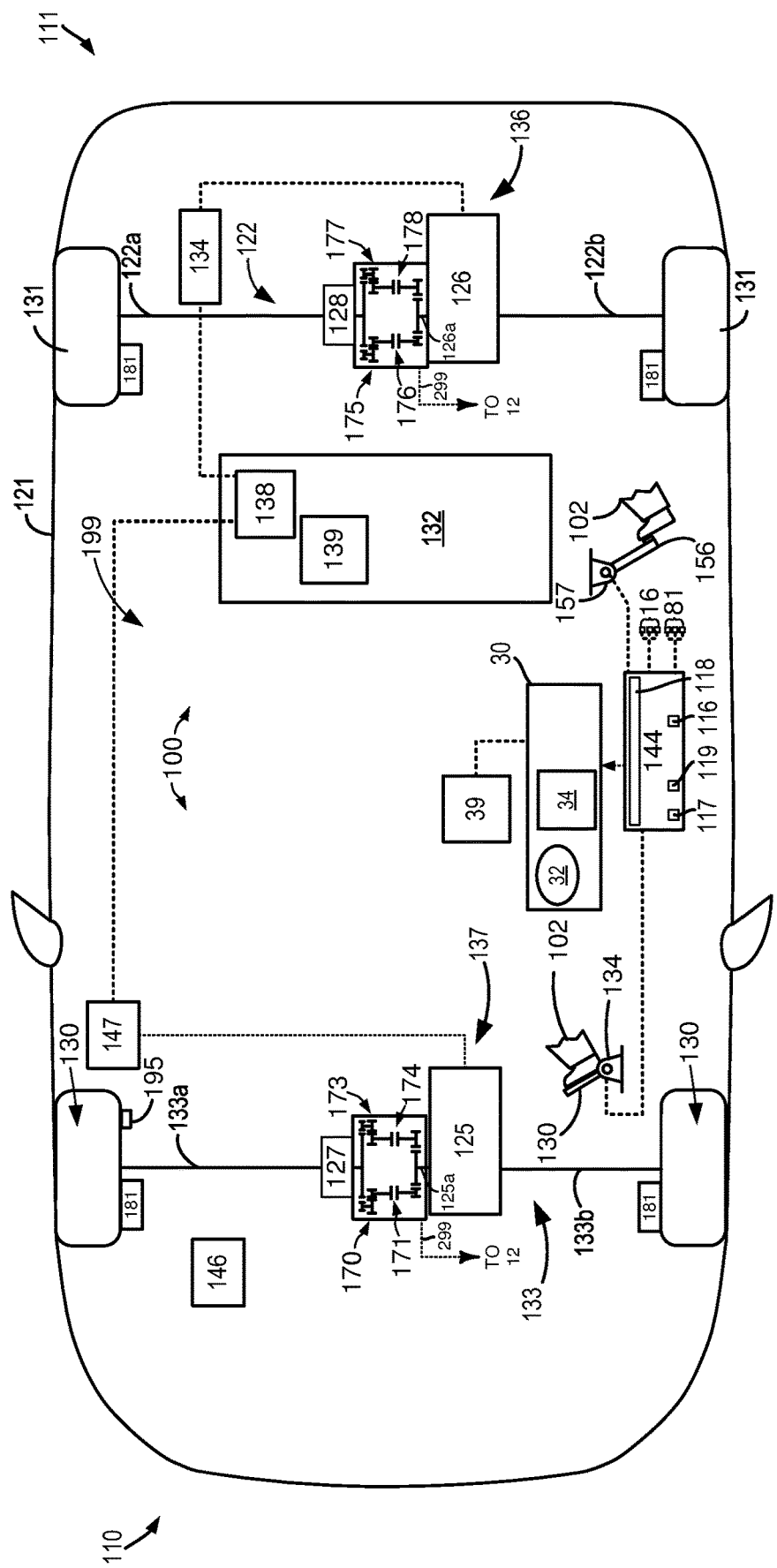
FIGS. 1A-1C show schematic representations of vehicles and drivelines that may be operated as described herein.
Figure 1B:
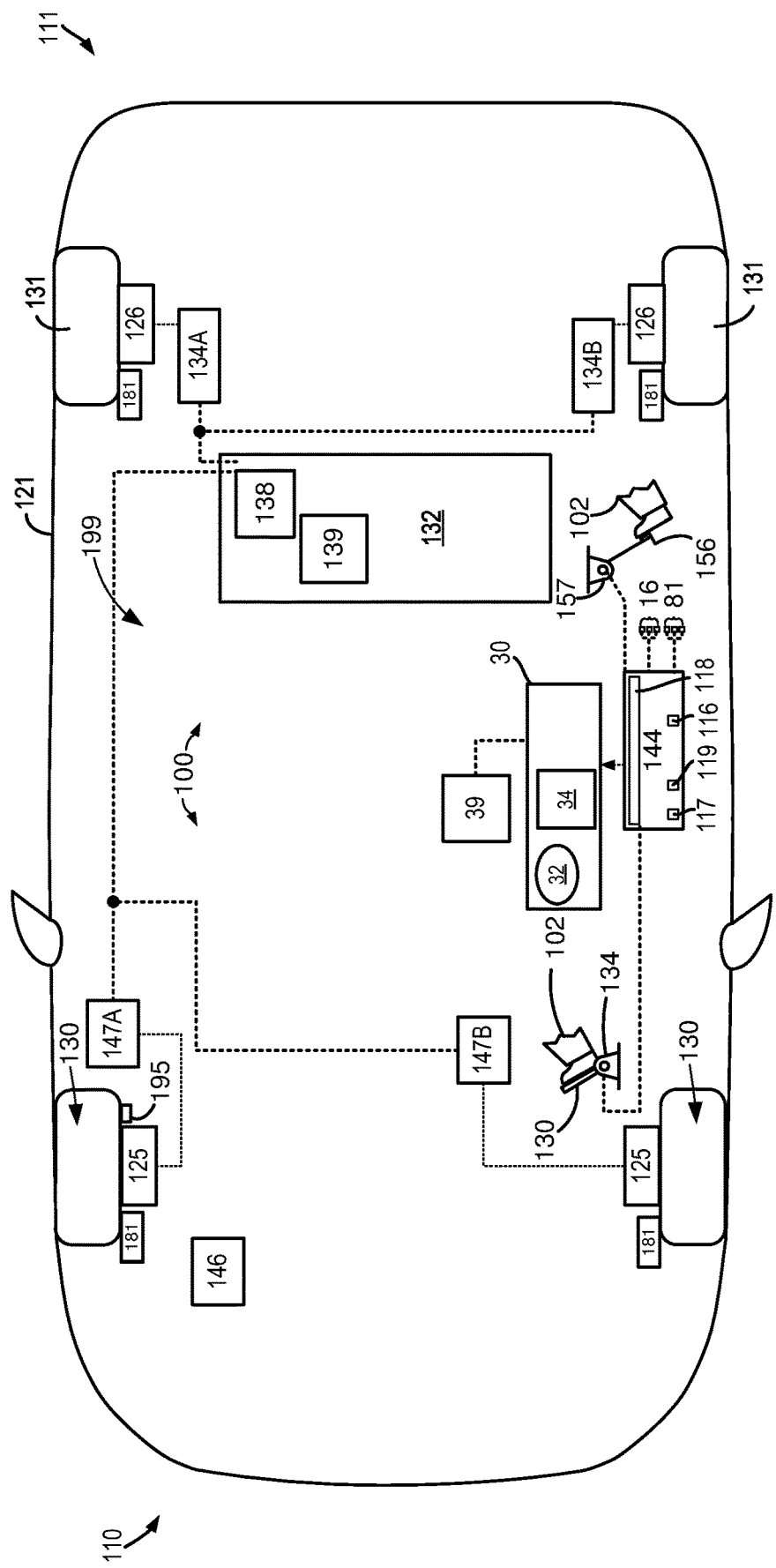
Figure 1C:
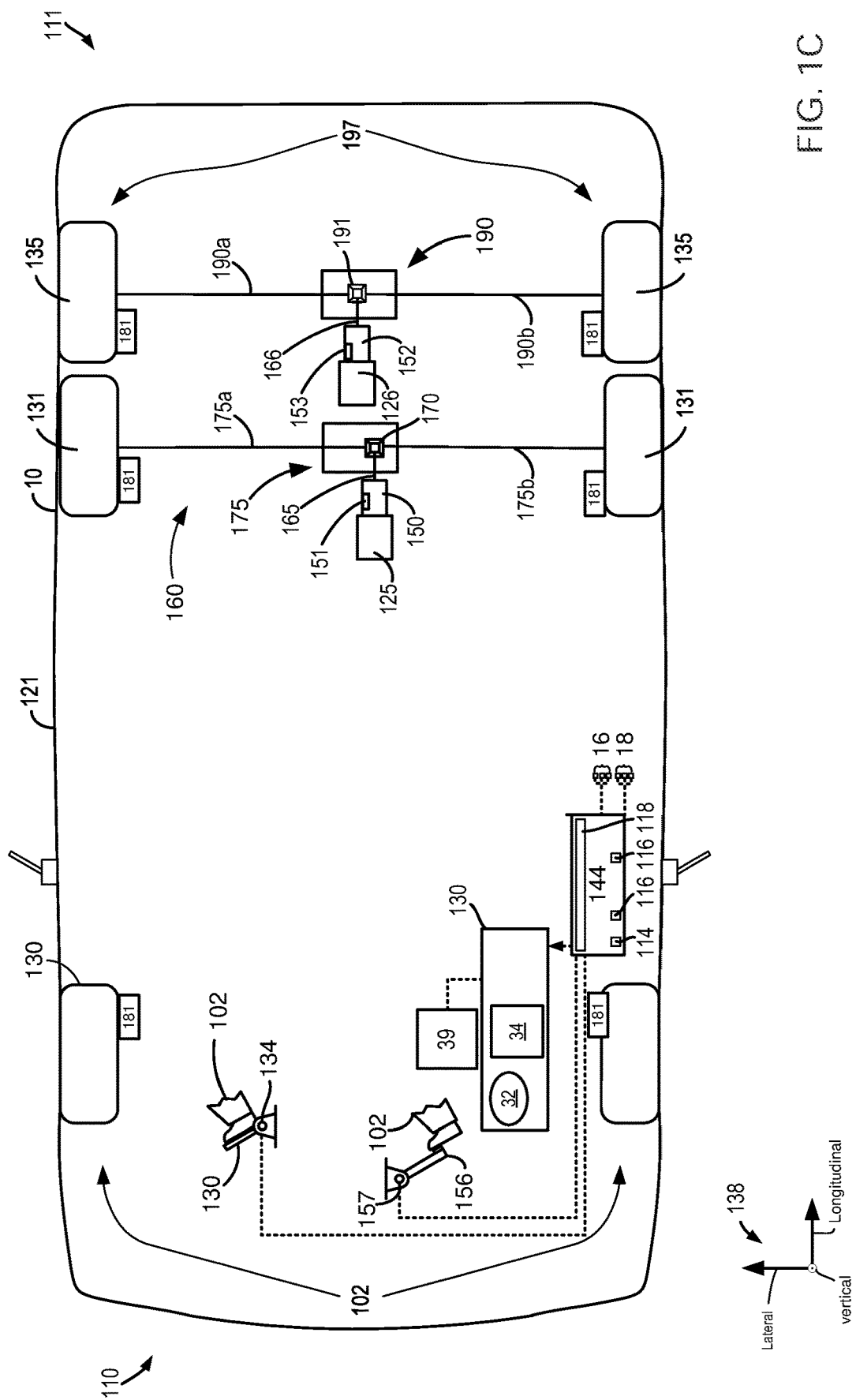
Figure 2:
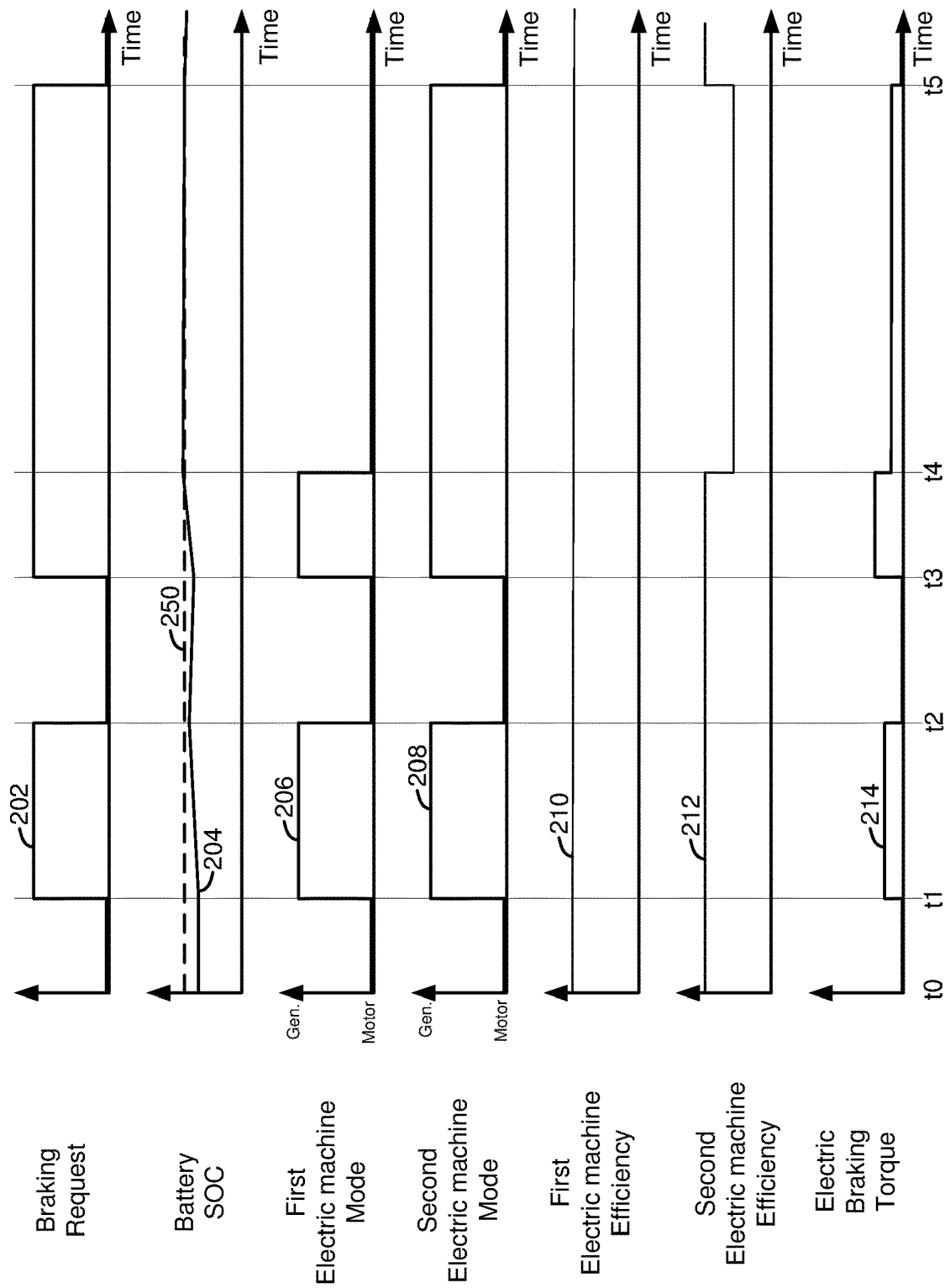
FIG. 2 is an example vehicle operating sequence according to the method of FIG. 3.

A vehicle may include two electric machines to provide propulsive effort. Each of the two electric machines may be operated in a motor mode and a generator mode. The motor mode may be used to propel the vehicle and the generator mode may be used to charge an electric energy device and/or slow the vehicle. The electric machines may be configured in a vehicle as shown in FIGS. 1A-1C or in other known configurations. The electric machines may be operated as shown in FIG. 2. The electric machines may be operated according to the method of FIG. 3.

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes at two propulsion sources including front electric machine 125 and rear electric machine 126. Electric machines 125 and 126 may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft 122a, and second half shaft 122b. Likewise, front axle 133 may comprise a first half shaft 133a and a second half shaft 133b. Vehicle propulsion system 100 further has front wheels 130 and rear wheels 131. In this example, front wheels 130 may be selectively driven via electric machine 125. Rear wheels 131 may be driven via electric machine 126.

The rear axle 122 is coupled to electric machine 126. Rear drive unit 136 may transfer power from electric machine 126 to axle 122 resulting in rotation of drive wheels 131. Rear drive unit 136 may include a low gear set 175 and a high gear 177 that are coupled to electric machine 126 via output shaft 126a of rear electric machine 126. Low gear 175 may be engaged via fully closing low gear clutch 176. High gear 177 may be engaged via fully closing high gear clutch 178. High gear clutch 177 and low gear clutch 178 may be opened and closed via commands received by rear drive unit 136 over CAN 299. Alternatively, high gear clutch 177 and low gear clutch 178 may be opened and closed via digital outputs or pulse widths provided via controller 144. Rear drive unit 136 may include differential or final drive 128 so that torque may be provided to axle 122a and to axle 122b. In some examples, an electrically controlled differential clutch (not shown) may be included in rear drive unit 136.

In some examples, rear drive unit 136 may include more than two gear ratios to transfer power from electric machine 126 to rear wheels 131.

The front axle 133 is coupled to electric machine 125. Front drive unit 137 may transfer power from electric machine 125 to axle 133 resulting in rotation of drive wheels 130. Front drive unit 137 may include a low gear set 170 and a high gear 173 that are coupled to electric machine 125 via output shaft 125a of front electric machine 125. Low gear 170 may be engaged via fully closing low gear clutch 171. High gear 173 may be engaged via fully closing high gear clutch 174. High gear clutch 174 and low gear clutch 171 may be opened and closed via commands received by front drive unit 137 over CAN 299. Alternatively, high gear clutch 174 and low gear clutch 171 may be opened and closed via digital outputs or pulse widths provided via control system 14. Front drive unit 137 may include differential or final drive 127 so that torque may be provided to axle 133a and to axle 133b. In some examples, an electrically controlled differential clutch (not shown) may be included in front drive unit 137. In some examples, front drive unit 137 may include more than two gear ratios to transfer power from electric machine 125 to front wheels 130.

Electric machines 125 and 126 are electrically coupled to and may receive electrical power from onboard electrical energy storage device 132. Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current generated by rear electric machine 126 to direct current for storage at the electric energy storage device 132 and vice versa. A second inverter system controller (ISC2) 147 may convert alternating current generated by front electric machine 125 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Controller 144 may communicate with one or more of electric machine 125, electric machine 126, energy storage device 132, etc. Controller 144 may receive sensory feedback information from one or more of electric machine 125, electric machine 126, energy storage device 132, etc. Further, controller 144 may send control signals to one or more of electric machine 125, electric machine 126, energy storage device 132, etc., responsive to this sensory feedback. Controller 144 may receive an indication of an operator requested output of the vehicle propulsion system from a human operator 102, or an autonomous controller. For example, controller 144 may receive sensory feedback from pedal position sensor 134 which communicates with pedal 130. Pedal 130 may refer schematically to a driver demand pedal. Similarly, controller 144 may receive an indication of an operator requested vehicle braking via a human operator 102, or an autonomous controller. For example, control system 14 may receive sensory feedback from pedal position sensor 157 which communicates with brake pedal 156. Controller 144 may provide vehicle braking solely via electric machines 125/126, solely via friction foundation brakes 181 (e.g., brake pads and rotors), of via a combination of electric machines 125/126 and friction foundation brakes 181. The vehicle braking torque that may be applied by electric machines 125/126 and friction foundations brakes may be based on a braking torque amount that is requested via brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132. Electric energy storage device 132 may receive and supply electric power to and from electric machines 125 and 126.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 144 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 144 includes non-transitory (e.g., read only memory) 117, random access memory 119, digital inputs/outputs 118, and a microcontroller 116.

Vehicle propulsion system 100 may also include an on-board navigation system 39 (for example, a Global Positioning System) on dashboard 30 that an operator of the vehicle may interact with. The navigation system 39 may include one or more location sensors for assisting in estimating a location (e.g., geographical coordinates) of the vehicle. For example, on-board navigation system 30 may receive signals from GPS satellites (not shown), and from the signal identify the geographical location of the vehicle. In some examples, the geographical location coordinates may be communicated to controller 144.

Dashboard 30 may further include a display system 32 configured to display information to the vehicle operator. Display system 32 may comprise, as a non-limiting example, a touchscreen, or human machine interface (HMI), display which enables the vehicle operator to view graphical information as well as input commands. In some examples, display system 32 may be connected wirelessly to the internet (not shown) via controller (e.g. 144). As such, in some examples, the vehicle operator may communicate via display system 32 with an internet site or software application (app).

Dashboard 30 may further include an operator interface 34 via which the vehicle operator may adjust the operating status of the vehicle. Specifically, the operator interface 34 may be configured to initiate and/or terminate operation of the vehicle driveline (e.g., electric machine 125 and electric machine 126) based on an operator input. Various examples of the operator ignition interface 34 may include interfaces that require a physical apparatus, such as an active key, that may be inserted into the operator interface 34 to start the electric machines 125 and 126 and to turn on the vehicle, or may be removed to shut down the electric machines 125 and 126 to turn off the vehicle. Other examples may include a passive key that is communicatively coupled to the operator interface 34. The passive key may be configured as an electronic key fob or a smart key that does not have to be inserted or removed from the interface 34 to operate the vehicle electric machines 125 and 126. Rather, the passive key may need to be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 144 to start the engine.

Referring now to FIG. 1B, a second example vehicle propulsion system 100 for vehicle 121 is shown. The vehicle 121 shown in FIG. 1B includes many of the components of the vehicle 121 shown in FIG. 1A. Therefore, for the sake of brevity, descriptions of equivalent components have been omitted. Components that are unique to vehicle 121 and shown in FIG. 1B are described below.

In this example, vehicle 121 does not include front and rear axles. Rather, vehicle 121 includes front wheel electric machines 125 and/or rear wheel electric machines 126. The front wheel electric machines 125 are shown positioned at front wheels 130 and the rear wheel electric machines 126 are shown positioned at the rear wheels 131. Vehicle 121 may include only front electric machines 125, or only rear electric machines 126, in some examples. The front wheel electric machines 125 may be supplied with electric power via inverters 147A (right wheel inverter) and 147B (left wheel inverter). Alternatively, front wheel electric machines 125 may supply electric power to electric energy storage device 132 via inverters 147A and 147B. Right and left wheel electric machines 125 may be controlled independently of each other and independent of rear wheel electric machines 126.

The rear wheel electric machines 126 may be supplied with electric power via inverters 134A (right wheel inverter) and 134B (left wheel inverter). Alternatively, rear wheel electric machines 126 may supply electric power to electric energy storage device 132 via inverters 134A and 134B. Right and left wheel electric machines 126 may be controlled independently of each other and independent of front wheel electric machines 125.

Referring now to FIG. 1C, a third example vehicle propulsion system 100 for vehicle 121 is shown. The vehicle 121 shown in FIG. 1C includes many of the components of the vehicle 121 shown in FIG. 1C. Therefore, for the sake of brevity, descriptions of equivalent components have been omitted. Components that are unique to vehicle 121 and shown in FIG. 1C are described below.

Vehicle 121 includes a front side 110 and a rear side 111. Vehicle 10 includes front wheels 130 and rear wheels 131 and 135. In this example, vehicle 121 is configured with a tandem axle 160. Vehicle 121 includes a first electric machine (e.g., a propulsion source) 125 that may selectively provide propulsive effort to tandem axle 160. In particular, first electric machine 125 is shown mechanically coupled to gearbox 150 including a plurality of gears 151, and gearbox 150 is mechanically coupled to a front axle 175 of tandem axle 160. First electric machine 125 may provide mechanical power to gearbox 150. Front axle 175 may receive mechanical power from gearbox 150 via driveshaft 165 so that mechanical power may be transmitted to rear wheels 131. Front axle 175 also comprises two half shafts, including a first or right haft shaft 175a and a second or left half shaft 175b. The front axle 175 may be an integrated axle that includes a front axle differential gear set or final drive 170.

Vehicle 121 also includes a second electric machine (e.g., a propulsion source) 126 that may selectively provide propulsive effort to tandem axle 160. In particular, second electric machine 126 is shown mechanically coupled to gearbox 152 including a plurality of gears 153, and gearbox 152 is mechanically coupled to a rear axle 190 of tandem axle 160. Second electric machine 126 may provide mechanical power to gearbox 152. Rear axle 190 may receive mechanical power from gearbox 152 via driveshaft 166 so that mechanical power may be transmitted to rear wheels 135. Rear axle 190 also comprises two half shafts, including a first or right haft shaft 190a and a second or left half shaft 190b. The rear axle 190 may be an integrated axle that includes a rear axle differential gear set or final drive 191.

Thus, the system of FIGS. 1A-1C provide for a vehicle system, comprising: a first electric machine; a second electric machine; an electric energy storage device; and a controller including executable instructions stored in non-transitory memory that cause the controller to operate the first electric machine in a motor mode and the second electric machine in a generator mode with the first electric machine consuming an entire amount of electric energy produced via the second electric machine. The vehicle system further comprises a first gearbox coupled to the first electric machine and a second gearbox coupled to the second electric machine. The vehicle system further comprises additional instructions to shift the first gearbox and the second gear box to provide a desired level of vehicle braking. The method further comprises additional instructions to shift the second gearbox to a numerically higher gear ratio than the first gearbox to increase vehicle braking torque. The vehicle system includes where the first electric machine is coupled to a first axle including a first final drive gear set, and where the second electric machine is coupled to a second axle. The vehicle system includes where first final drive gear set has a different gear ratio than the second final drive gear set. The vehicle system includes where the first axle is a rear axle and the second axle is a front axle. The vehicle system includes where first electric machine is operated in the motor mode and the second electric machine is operated in the generator mode in response to a temperature of the electric energy storage device.

Referring now to FIG. 2, an example vehicle operating sequence is shown. The sequence of FIG. 2 may be provided via the systems of FIGS. 1A-1C in cooperation with the method of FIG. 3. The plots shown in FIG. 2 are time aligned and they occur at a same time. The vertical lines at times t0-t5 represent times of interest in the sequence.

The first plot from the top of FIG. 2 is a plot of a vehicle braking request state versus time. The vertical axis represents the vehicle braking state and vehicle braking is requested when trace 202 is at a level that is near the vertical axis arrow. Vehicle braking is not being requested when trace 202 is at a level that is near the horizontal axis. The horizontal axis represents time and time increases from the left side of the plot to the right side of the plot. Trace 202 represents the vehicle braking state. A vehicle braking request may be initiated via applying a brake pedal or via an autonomous driver.

The second plot from the top of FIG. 2 is a plot of a battery state of charge versus time. The vertical axis represents battery state of charge (SOC) and the battery state of charge increases in the direction of the vertical axis arrow. The battery state of charge is zero at the level of the horizontal axis. The horizontal axis represents time and time increases from the left side of the plot to the right side of the plot. Trace 204 represents the battery state of charge level. Horizontal line 250 represents a threshold level that the battery state of charge may exceed.

The third plot from the top of FIG. 2 is a plot that indicates an operating mode of a first electric machine of a vehicle versus time. The first electric machine may be operated in a generator mode where the first electric machine generates electric power and delivers the electric power to a power bus. The first electric machine may also be operated in a motor mode where the first electric machine generates mechanical power to propel a vehicle. The first electric machine may operate in the generator mode when trace 206 is at a higher level that is near the vertical axis arrow. The first electric machine may operate in a motor mode when trace 206 it at a lower level that is near the horizontal axis. The horizontal axis represents time and time increases from the left side of the plot to the right side of the plot. Trace 206 represents the operating mode of the first electric machine. In this example, the first electric machine may be coupled to a front axle of the vehicle.

The fourth plot from the top of FIG. 2 is a plot that indicates an operating mode of a second electric machine of a vehicle versus time. The second electric machine may be operated in a generator mode where the second electric machine generates electric power and delivers the electric power to a power bus. The second electric machine may also be operated in a motor mode where the second electric machine generates mechanical power to propel a vehicle. The second electric machine may operate in the generator mode when trace 208 is at a higher level that is near the vertical axis arrow. The second electric machine may operate in a motor mode when trace 208 it at a lower level that is near the horizontal axis. The horizontal axis represents time and time increases from the left side of the plot to the right side of the plot. Trace 208 represents the operating mode of the second electric machine. In this example, the second electric machine may be coupled to a rear axle of the vehicle.

The fifth plot from the top of FIG. 2 is a plot that indicates an operating efficiency of the first electric machine of a vehicle versus time. The first electric machine operating efficiency may be adjusted via changing a speed of the first electric machine via a gear set of a transmission. In addition, the operating efficiency of the first electric machine may be adjusted via adjusting output of an inverter that is electrically coupled to the first electric machine. The vertical axis represents the operating efficiency of the first electric machine whether the first electric machine is operating in a motor or generator mode. The horizontal axis represents time and time increases from the left side of the plot to the right side of the plot. Trace 210 represents the operating efficiency of the first electric machine.

The sixth plot from the top of FIG. 2 is a plot that indicates an operating efficiency of the second electric machine of a vehicle versus time. The second electric machine operating efficiency may be adjusted via changing a speed of the second electric machine via a gear set of a transmission. In addition, the operating efficiency of the second electric machine may be adjusted via adjusting output of an inverter that is electrically coupled to the second electric machine. The vertical axis represents the operating efficiency of the second electric machine whether the second electric machine is operating in a motor or generator mode. The horizontal axis represents time and time increases from the left side of the plot to the right side of the plot. Trace 212 represents the operating efficiency of the second electric machine.

The seventh plot from the top of FIG. 2 is a plot of electric braking torque (e.g., braking torque that is provided by electric machines) versus time. The vertical axis represents an amount of braking torque and the amount of braking torque increases in the direction of the vertical axis arrow. The horizontal axis represents time and time increases from the left side of the plot to the right side of the plot. Trace 214 represents the amount of electric braking torque.

At time t0, vehicle braking is not requested and the battery SOC is less than threshold 250. The first and second electric machines are operating in motor mode so as to provide torque to propel the vehicle (not shown). The operating efficiency of the first and second electric machines is at a high level and the vehicle braking torque is zero.

At time t1, vehicle braking is requested. The SOC is low so the first electric machine and the second electric machine are operated in a generator mode so as to increase the battery SOC and provide a braking torque to slow the vehicle. The first and second electric machine continue to operate at a high efficiency and the electric braking torque is a low level braking torque.

At time t2, the vehicle braking request is withdrawn and the battery SOC begins to be reduced. The first electric machine and the second electric machine are operated in a motor mode. The efficiency of the first and second electric machines remains at a higher level. The electric braking torque is reduced to zero.

At time t3, vehicle braking is requested a second time in the sequence. The battery SOC is below threshold 250 so the first electric machine and the second electric machine are both operated in generator mode to charge the battery. The efficiency of the first and second electric machines is at a high level and the braking torque is a middle level.

At time t4, the vehicle braking request remains asserted and the battery SOC reaches the level of threshold 250. Therefore, the first electric machine switches to operating in motor mode and the second electric machine remains operating in generator mode. The efficiency of the first electric machine is maintained and the efficiency of the second electric machine is reduced. In this example, the overall braking torque level is decreased, but electric braking continues to be provided. The requested braking torque amount (not shown) may be provided via a combination of electric braking and by applying the friction foundation brakes.

At time t5, the vehicle braking request is withdrawn and the first and second electric machines both operate in motor mode. The battery SOC is high and the efficiency of the first and second electric machines is at a high level. The vehicle braking torque is also reduced to zero.

By operating the first electric machine in a motor mode and the second electric machine in generator mode, the first electric machine may consume all electric power that is generated and output by the second electric machine so that net power flow to/from the battery is zero so that battery SOC may not increase above a desired level. For example, if the second electric machine outputs 100 kilowatts, the first electric machine may consume 100 kilowatts. It should be appreciated that the sequence of FIG. 2 is only one example of how the first and second electric machines may be operated. In other examples, the second electric machine may be operated as a motor and the first electric machine may be operated as a generator when the battery SOC reaches a threshold level.

Figure 3:
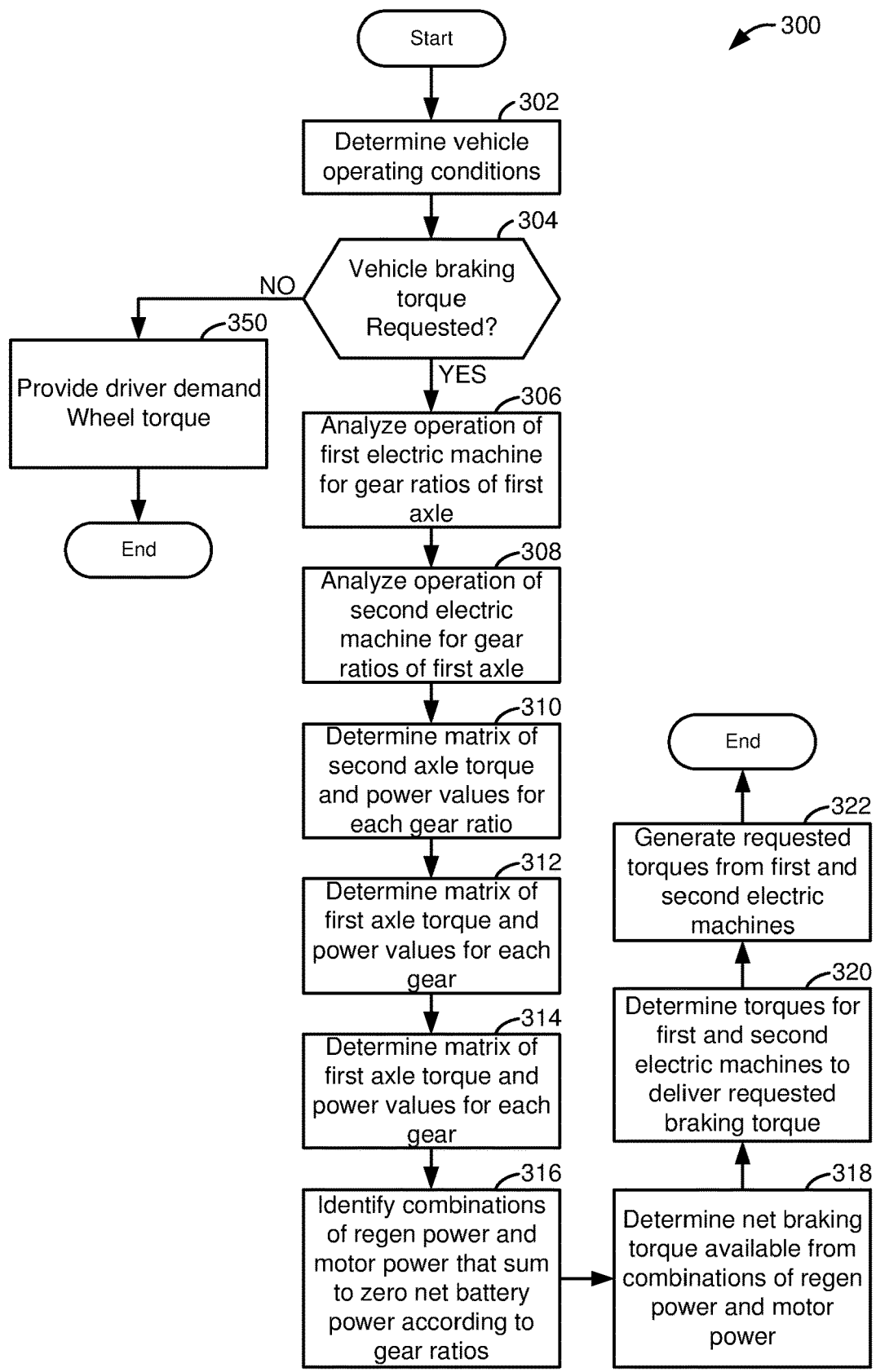
FIG. 3 is a flowchart of an example method for operating a vehicle that includes two electric machines.

Referring now to FIG. 3, a method for operating two or more electrical machines is shown. The method of FIG. 3 may be included in the systems of FIGS. 1A-1C as executable instructions stored in non-transitory memory. Further still, at least portions of the method of FIG. 3 may be actions performed in the physical world by a controller operating an actuator, for example.

At 302, method 300 determines vehicle operating conditions. Vehicle operating conditions may include, but are not limited to present vehicle speed, present vehicle braking torque request amount, battery SOC, battery fault state, battery temperature, current gear of the first axle that is requested, and the current gear of the second axle that is requested. Method 300 proceeds to 304.

At 304, method 300 judges if conditions are present to recirculate electric power between the first and second electric machines. In addition, if the vehicle includes more than two electric machines to deliver and/or receive electric power, method 300 may judge if conditions are present to recirculate electric power between a plurality (e.g., four) of electric machines. In one example, method 300 may judge to recirculate electric power (e.g., deliver electric power from one electric machine to another electric machine) between the electric machines if battery SOC is greater than a threshold level SOC OR battery power limits are less than a lower threshold battery power limit OR the battery fault state is true OR if battery temperature is greater than a threshold temperature. The "OR" text represents a logical or condition. If method 300 judges that conditions are present to recirculate electric power, the answer is yes and method 300 proceeds to 306. Otherwise, the answer is no and method 300 proceeds to 350. Method 300 may also require that a vehicle braking torque is requested to proceed to 306.

At 350, method 300 provides a requested driver demand wheel torque via the first and second electric machines. In one example, method 300 determines a requested driver demand wheel torque according to a position of a driver demand pedal and a position of a brake pedal. For example, to propel the vehicle, a human driver may apply the driver demand pedal so as to request +200 Newton-meters of wheel torque. Conversely, the human driver may apply the brake pedal so as to request −100 Newton-meters of wheel torque to slow the vehicle. The driver demand torque may be split between the two electric machines, or alternatively, one of the two electric machines may provide driver demand wheel torque. Method 300 may command the first and second electric machines to provide the requested driver demand wheel torque taking the presently engaged transmission gear ratio and the final drive ratio into account. Method 300 proceeds to exit.

During conditions when a battery is not prepared to receive additional charge, such as when battery temperature is high and when battery SOC is high, it may still be desirable to provide electric vehicle braking (e.g., vehicle braking that is provided by electric machines). However, to provide braking, the electric machines need to be able to deliver electric power to another device. From this perspective, the present description provides for recirculating electric power from one electric machine to another electric machine. It may be demonstrated that by exploiting electric machine inefficiencies a net negative or braking axle torque with net zero battery charging may be achievable. In particular, one electric machine may be operated inefficiently as a generator to provide a large negative torque to the driveline while another electric machine is operated as a motor providing a small positive torque to the driveline. The electric power that is generated by the electric machine operating as a generator may be consumed by the electric machine that is operating as a motor as shown below.

Define the absolute value of battery power as follows for the motoring and generating cases according to the following equations:

$$P_{battery,gen} = T_{gen} \cdot \omega_{gen} \cdot \eta_{gen} \qquad (1)$$

$$P_{battery,motor} = \frac{T_{motor} \cdot \omega_{motor}}{\eta_{motor}} \qquad (2)$$

where $P_{battery,gen}$ is the amount of electric power that is produced by operating the electric machine as a generator, $T_{gen}$ is the mechanical torque that is input to the electric machine, $\omega_{gen}$ is the angular speed of the electric machine, $\eta_{gen}$ is the efficiency of the electric machine that is operating as a generator, $P_{battery,motor}$ is the amount of electric power that is consumed by the electric machine that is operating as a motor, $T_{motor}$ is the mechanical torque that is generated by the electric machine that is operating as a motor, $\omega_{motor}$ is the angular speed of the electric machine that is operating as a motor, and $\eta_{motor}$ the efficiency of the electric machine that is operating as a motor.

Assume that the generator and motor speeds are equal and that the torque commands are identical. Next, calculate the ratio of battery generator power over battery motor power as follows:

$$\frac{P_{battery,gen}}{P_{battery,motor}} = \frac{T_{gen} \cdot \omega_{gen} \cdot \eta_{gen}}{\frac{T_{motor} \cdot \omega_{motor}}{\eta_{motor}}} = \eta_{gen} \cdot \eta_{motor} < 1 \qquad (3)$$

Thus, in an identical torque and speed case, the net power generation solely due to component efficiencies in this example will discharge the battery. In this way, a braking torque may be generated when one electric machine operates as a motor and when another electric machine operates as a generator.

An additional constraint may be applied to keep the battery from discharging or charging. In particular, a constraint may be applied to provide a target net zero battery power consumption as follows:

$$P_{battery,gen} = P_{battery,motor} \qquad (4)$$

-continued $$T_{gen} \cdot \omega_{gen} \cdot \eta_{gen} = \frac{T_{motor} \cdot \omega_{motor}}{\eta_{motor}} \quad (5)$$

$$\frac{T_{gen}}{T_{motor}} = \frac{1}{\eta_{gen} + \eta_{motor}} > 1 \quad (6)$$

Thus, for the net zero battery power constraint, proof is given that the generator torque is greater than motor torque. As such, there may be a net negative braking torque from the combined system. Thus, it may be shown that by exploiting component efficiencies and commanding a net zero battery power target the resulting unequal electric machine torques can achieve a net negative braking torque while maintaining a net zero battery charge/discharge power.

In addition, transmission gear ratios may allow for unequal electric machine speeds and differing axle torque magnitudes. For example, assume axle 1 is the motoring axle at ratio FD1(final drive ratio 1)*G1(gear ratio 1) and axle 2 is the generating axle at ratio FD2(final drive ratio 2)*G2(gear ratio 2).

$$\text{net brake torque} = FD1 \cdot G1 \cdot T_{motor} + FD2 \cdot G2 \cdot T_{gen} \quad (7)$$

From equation (5):

$$T_{gen} = \frac{T_{motor} \cdot \omega_{motor}}{\eta_{motor} \cdot \omega_{gen} \cdot \eta_{gen}} \quad (8)$$

The ratio of machine speeds is FD1*G1/FD2*2G2 so, $$T_{gen} = \frac{T_{motor} \cdot G1 \cdot FD1}{\eta_{motor} \cdot G2 \cdot FD2 \cdot \eta_{gen}} \quad (9)$$

$$\text{Similarly, } T_{motor} = \frac{T_{gen} \cdot G2 \cdot FD2 \cdot \eta_{motor} \cdot \eta_{gen}}{G1 \cdot FD1} \quad (10)$$

$$\text{net brake torque} = FD1 \cdot G1 \cdot \frac{T_{gen} \cdot G2 \cdot FD2 \cdot \eta_{motor} \cdot \eta_{gen}}{G1 \cdot FD1} + FD2 \cdot G2 \cdot \frac{T_{motor} \cdot G1 \cdot FD1}{\eta_{motor} \cdot G2 \cdot FD2 \cdot \eta_{gen}} \quad (11)$$

$$\text{net brake torque} = FD2 \cdot G2 \cdot T_{gen} \cdot \eta_{motor} \cdot \eta_{gen} + FD1 \cdot G1 \cdot \frac{T_{motor}}{\eta_{motor} \cdot \eta_{gen}} \quad (12)$$

The motor/generator efficiencies may reduce the negative torque in the first equation term and increase the positive torque in the second term of equation 12. In a multi-speed gearing system holding G2 numerically higher on the generating axle in relation to G1 on the motoring axle also increases negative net braking torque as does using FD2 numerically higher than FD1. The use of different gear ratios limits the overlap between motors in the power domain, thereby eliminating portions of the motor map for consideration of the net zero battery power constraint. Therefore, peak recirculation vehicle braking torque may result from selecting similar gearbox ratios coupled with moderately asymmetric axle ratios.

At 306, method 300 determines feasible motor and generator operating conditions for each gear combination according to the present vehicle speed and the resulting electric machine speeds for each gear. For example, if the present vehicle speed is 40 kilometers per hour and a vehicle braking request is 200 Newton-meters, method 300 determines electric machine speeds corresponding to each transmission gear and final drive ratio for each electric machine. Thus, if the first electric machine is coupled to a transmission having three gears (1G1, 1G2, 1G3) and a final drive ration FD1, the speeds of the first electric machine for the present vehicle speed may be determined according to the following equation: N1=Ws*1G1*FD1, where there is no slip between the first electric machine and the wheels, where N1 is the rotational speed of the first electric machine, and where Ws is the vehicle's wheel speed. The speed of the first electric machine when the transmission is engaged in its other gears may be determined in a similar way. In addition, the speed of the second electric machine may be determined in a similar way.

The requested wheel braking torque may be converted into a requested torque for the first electric machine assuming the first electric machine is to provide the requested braking torque and torque to counter act torque generated by the second electric machine via the following equation: T1=Wt+T2W/(1G1*FD1) where T1 is torque of the first electric machine, Wt is the requested wheel torque, T2W is the wheel torque generated by the second electric machine, 1G1 is the gear ratio of the engaged transmission gear, and FD1 is the final drive ratio. The first electric machine torque may be further adjusted for gear losses. The torque of the first electric machine when the transmission is engaged in its other gears may be determined in a similar way. The requested torque for the second electric machine when the transmission is engaged in its various gears may be determined via a values in a map stored in controller memory that are referenced by present vehicle speed and driver demand wheel torque. Of course, in some examples, the second electric machine may operate in generator mode while the first electric machine operates in motor mode to provide the requested vehicle braking torque.

Method 300 may reference a motor operation map and a generator mode map. In this example, the speed, torque, and efficiency values for the first electric machine in each transmission gear may reference the generator map, and the speed, torque, and efficiency values for the second electric machine in each transmission gear may reference the motor map. Speeds and torques for the first electric machine that are included in referenced generator or motor maps may be characterized as feasible operating points. The motor and generator maps do not include unfeasible operating points. Likewise, speeds and torques for the second electric machine that are included in referenced generator or motor maps may be characterized as feasible operating points. The motor and generator maps do not include unfeasible operating points. Method 300 proceeds to 308 after the feasible operating conditions for the first and second electric machines are determined.

At 308, method 300 determines power output of each feasible operating condition for the electric machines. Method 300 applies the battery net zero power constraint $P_{battery,gen} = P_{battery,motor}$ to determine the power output for each electric machine. In particular, method 300 applies equation 12 for each feasible operating condition that was determined at 306. Thus, the net zero battery power and speed constraints may be applied to the electric machines. The net zero battery power constraint may be applied when the electric power output of the electric machine operating as the generator is equal to, or substantially equal to (e.g., within +5%) the electric power consumed by the electric machine that is operating as the motor. The result may be a group of net braking torques for the feasible operating conditions. Method 300 proceeds to 310.

At 310, method 300 selects vehicle operating conditions that most closely meet the requested driver demand wheel torque from the set of feasible operating conditions that satisfy the net zero battery power constraint. For example, if feasible operating conditions (e.g., electric machine speed and transmission gear ratio) include net braking torque values of 500 Newton-meters, 525 Newton-meters, and 575 Newton-meters for the present vehicle speed and the requested braking torque is 505 Newton-meters for the present vehicle speed, the operating conditions (e.g., electric machine speed and transmission gear ratio) that provide 500 Newton-meters may be selected since it is closest to the requested 505 Newton-meters. Method 500 may request friction braking torque for conditions when the selected operating conditions provide less than the requested driver demand braking wheel torque.

At 312, method 300 generates output from the first electric machine, the second electric machine, the first gearbox, and the second gearbox to meet the requested driver demand wheel torque and net zero battery power constraint. In particular, method 300 commands the first electric machine to operate as a motor or generator, commands the second electric machine to operate in an opposite mode as compared to the first electric machine, commands the first gearbox or transmission to a first gear ratio, and commands the second gearbox or transmission to a second gear ratio so as to meet the operating conditions that were selected at 310. Method 300 proceeds to exit.

In this way, method 300 may operate two or more electric machines such that one or more electric machines operates as an inefficient generator and one or more electric machines operate as a motor. The electric machines that operate as a motor consume electric energy that is generated by the electric machines that are operated as generators so that a battery does not accept charge while vehicle braking is provided by at least one electric machine. As a result, regenerative braking (e.g., converting the vehicle's kinetic energy into electric energy) may be provided without charging a battery.

Thus, method 300 provides for a method for operating a vehicle, comprising: operating a first electric machine in a motor mode; operating a second electric machine in a generator mode, while operating the first electric machine in the motor mode, and while a net power amount exchanged between an electric energy storage device and the first electric machine and the second electric machine is zero or substantially zero. In other words, electric power that is output by the second electric machine is consumed by the first electric machine while none of the electric power that is output by the second electric machine is stored in a battery. The method includes where the first electric machine is coupled to a first axle and the second electric machine is coupled to a second axle. The method includes where the first electric machine and the second electric machine are coupled to a vehicle's front wheels, or where the first electric machine and the second electric machine are coupled to the vehicle's rear wheels. The method includes where the electric energy storage device is a battery or a capacitor. The method further comprises reducing a speed of the vehicle via the second electric machine while operating the first electric machine in the motor mode. The method further comprises operating the first electric machine to consume electric power generated via the second electric machine. The method further comprises operating the second electric machine in the generator mode and the first electric machine in the motor mode in response to a state of charge of the electric energy storage device.

The method of FIG. 300 also provides for a method for operating a vehicle, comprising: reducing a speed of the vehicle via a second electric machine in response to a braking request without providing electric power from the second electric machine to an electric energy storage device. The method further comprises a first electric machine consuming electric power generated by the second electric machine while reducing the speed of the vehicle via the second electric machine. The method includes wherein the second electric machine is operated in a generator mode. The method further comprises adjusting a gear ratio of a gearbox to adjust an efficiency of the second electric machine, the gearbox coupled to the second electric machine. The method further comprises reducing the speed of the vehicle via the second electric machine in response to a temperature of the electric energy storage device.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the terms "approximately" and "substantially" are construed to mean plus or minus five percent of the range, unless otherwise specified.

The invention claimed is:

1. A method for operating a vehicle, comprising:
operating a first electric machine in a motor mode; and
operating a second electric machine in a generator mode, while simultaneously operating the first electric machine in the motor mode, and while a net power amount to and from an electric energy storage device is substantially zero;
where the first electric machine and the second electric machine are each configured to be operable in each of a motor mode and a generator mode; and
where the electric energy storage device is a battery or a capacitor.

2. The method of claim 1, where the first electric machine is coupled to a first axle and the second electric machine is coupled to a second axle.

3. The method of claim 1, where the first electric machine and the second electric machine are coupled to a vehicle's front wheels, and the first electric machine is coupled to the vehicle's front right wheel and controlled independently of the second electric machine coupled to the vehicle's front left wheel, or where the first electric machine and the second electric machine are coupled to the vehicle's rear wheels, and the first electric machine is coupled to the vehicle's rear right wheel and controlled independently of the second electric machine coupled to the vehicle's rear left wheel.

4. The method of claim 1, further comprising reducing a speed of the vehicle via the second electric machine while operating the first electric machine in the motor mode.

5. The method of claim 1, further comprising operating the first electric machine to consume electric power generated via the second electric machine.

6. The method of claim 1, further comprising operating the second electric machine in the generator mode and the first electric machine in the motor mode in response to a state of charge of the electric energy storage device.

7. A vehicle system, comprising:
a first electric machine;
a second electric machine;
an electric energy storage device; and
a controller including executable instructions stored in non-transitory memory that cause the controller to operate the first electric machine in a motor mode and the second electric machine in a generator mode with the first electric machine consuming an entire amount of electric energy produced via the second electric machine.

8. The vehicle system of claim 7, further comprising a first gearbox coupled to the first electric machine, a second gearbox coupled to the second electric machine, and a tandem axle, where the first electric machine selectively provides propulsive effort to the tandem axle.

9. The vehicle system of claim 8, further comprising additional instructions to shift the first gearbox and the second gear box to provide a desired level of vehicle braking.

10. The vehicle system of claim 8, further comprising additional instructions to shift the second gearbox to a numerically higher gear ratio than the first gearbox to increase vehicle braking torque.

11. The vehicle system of claim 7, where the first electric machine is coupled to a first axle including a first final drive gear set, and where the second electric machine is coupled to a second axle including a second final drive gear set.

12. The vehicle system of claim 11, where the first final drive gear set has a different gear ratio than the second final drive gear set.

13. The vehicle system of claim 11, where the first axle is a rear axle and the second axle is a front axle.

14. The vehicle system of claim 7, where the first electric machine is operated in the motor mode and simultaneously the second electric machine is operated in the generator mode in response to a temperature of the electric energy storage device.

15. A method for operating a vehicle, comprising:
reducing a speed of the vehicle via a second electric machine, coupled to a second axle, in response to a braking request without providing electric power from the second electric machine to an electric energy storage device;
where a first electric machine, coupled to a first axle, consumes the electric power generated by the second electric machine while reducing the speed of the vehicle via the second electric machine.

16. The method of claim 15, where the second electric machine is operated in a generator mode to provide a negative torque to a driveline while the first electric machine is operated in a motor mode to provide a positive torque to the driveline, and where the negative torque is larger than the positive torque.

17. The method of claim 15, further comprising adjusting a gear ratio of a gearbox to adjust an efficiency of the second electric machine, the gearbox coupled to the second electric machine.

18. The method of claim 15, further comprising reducing the speed of the vehicle via the second electric machine in response to a temperature of the electric energy storage device.

19. The vehicle system of claim 7, further comprising additional instructions to operate the first electric machine in the motor mode and the second electric machine in the generator mode in response to a state of charge of the electric energy storage device being greater than a threshold.

20. The method of claim 15, further comprising reducing the speed of the vehicle via the second electric machine and the first electric machine in response to the braking request when a state of charge of the electric energy storage device is less than a threshold, where the speed of the vehicle is reduced via the second electric machine in response to the braking request without providing electric power from the second electric machine to the electric energy storage device when the state of charge of the electric energy storage device is greater than the threshold.

* * * * *